(12) United States Patent
Nallamothu et al.

(10) Patent No.: US 12,510,359 B2
(45) Date of Patent: Dec. 30, 2025

(54) PRECISION RATE DEMODULATION FOR A VIBRATING GYROSCOPE

(71) Applicant: STMicroelectronics International N.V., Geneva (CH)

(72) Inventors: Pavan Nallamothu, Little Elm, TX (US); Milad Alwardi, Allen, TX (US); Deyou Fang, Frisco, TX (US); Yamu Hu, Allen, TX (US); David McClure, Carrollton, TX (US)

(73) Assignee: STMicroelectronics International N.V., Geneva (CH)

( * ) Notice: Subject to any disclaimer, the term of this patent is extended or adjusted under 35 U.S.C. 154(b) by 65 days.

(21) Appl. No.: 18/643,403

(22) Filed: Apr. 23, 2024

(65) Prior Publication Data

US 2025/0327665 A1 Oct. 23, 2025

(51) Int. Cl.
*G01C 19/5776* (2012.01)
*H03D 3/00* (2006.01)

(52) U.S. Cl.
CPC ......... *G01C 19/5776* (2013.01); *H03D 3/009* (2013.01); *H03D 2200/0025* (2013.01); *H03D 2200/0031* (2013.01); *H03D 2200/0047* (2013.01); *H03D 2200/005* (2013.01)

(58) Field of Classification Search
CPC ... H04B 3/52; H04B 3/54; H04B 3/56; H04B 3/58; H04B 3/36; H04B 2203/5441; H04B 3/46; H04B 2203/5483; H04B 3/542; G01C 19/5776; G01C 19/5712; G01C 19/5726; G01C 25/005; G01C 19/00; G01C 25/00; G01C 19/5649; G01C 19/5656; H04W 72/0453; H04W 88/08; H04W 16/28; H04W 84/047; H04W 16/26; H04W 4/029; H04W 4/70; H04W 88/085
See application file for complete search history.

(56) References Cited

U.S. PATENT DOCUMENTS

| | | | |
|---|---|---|---|
| 6,069,505 A * | 5/2000 | Babanezhad | H03L 7/099 327/558 |
| 6,262,624 B1 * | 7/2001 | Tsinker | H03L 7/0891 327/552 |
| 7,382,167 B1 | 6/2008 | Umminger et al. | |
| 9,885,577 B2 | 2/2018 | Tsinker | |
| 10,030,976 B2 | 7/2018 | Dewall | |
| 2017/0328712 A1 * | 11/2017 | Collin | H03M 3/458 |

(Continued)

FOREIGN PATENT DOCUMENTS

| | | |
|---|---|---|
| CN | 106885563 A | 6/2017 |
| CN | 110708047 B | 1/2020 |

(Continued)

*Primary Examiner* — Eva Y Puente
(74) *Attorney, Agent, or Firm* — Slater Matsil LLP (57) ABSTRACT

According to an embodiment, a circuit is proposed for generating rate and quadrature demodulation signals, incorporating unidirectional hysteresis for negative edges. The circuit features a preliminary stage that amplifies the differential sinusoidal signal from gyroscopic proof mass oscillations; a gain stage for boosting this signal with adjustable hysteresis levels; an output stage delivering a full-swing square wave output; and a customizable offset component to deepen the drop in the non-inverting compared to the inverting signal for the third signal's falling edge.

20 Claims, 5 Drawing Sheets (56) References Cited

U.S. PATENT DOCUMENTS

| | | | | |
|---|---|---|---|---|
| 2024/0240945 A1* | 7/2024 | Gattere | ............. | G01C 19/5776 |
| 2025/0052573 A1* | 2/2025 | Mazzarella | ........ | G01C 19/5762 |
| 2025/0238145 A1* | 7/2025 | Sahoo | ................... | G06F 3/0673 |

FOREIGN PATENT DOCUMENTS

| | | | |
|---|---|---|---|
| CN | 114577194 | A | 6/2022 |
| CN | 217032521 | U | 7/2022 |
| WO | 2019221774 | A2 | 11/2019 |

\* cited by examiner

PRECISION RATE DEMODULATION FOR A VIBRATING GYROSCOPE

TECHNICAL FIELD

The present disclosure generally relates to electronic devices and, in particular embodiments, to precision rate demodulation for a vibrating gyroscope.

BACKGROUND

Generally, a gyroscope measures the rotation rate around its sensitive axis by utilizing the Coriolis effect, which arises from the conservation of angular momentum. When a gyroscope with a vibrating element is subjected to rotation, the Coriolis force comes into play due to the motion of a vibrating element's mass in the context of the rotating reference frame.

The gyroscope includes a mass that is set into oscillation along one axis. When the gyroscope rotates about an axis perpendicular to the oscillation direction, the Coriolis force acts on the moving mass, generating a secondary vibration orthogonal to the input rotation axis and the primary vibration axis. The magnitude of this secondary vibration is directly proportional to the rate of rotation, and its direction depends on the direction of rotation.

To extract rate and quadrature information, the gyroscope detects the secondary vibrations caused by the Coriolis force. These vibrations are at the same frequency as the primary vibration but phase-shifted. The rate signal can be demodulated by phase shifting the resonance frequency ($F_d$) which would demodulate the delta in capacitance along the rate axis proportional to the angular rate.

The quadrature signal is a component of the output signal that arises due to imperfections in the gyroscope, such as manufacturing inaccuracies or asymmetries. To isolate useful rate information, the quadrature component must be carefully separated and typically eliminated or minimized through various electronic circuitry or signal processing algorithms designed to ignore or cancel out this unwanted signal.

SUMMARY

Technical advantages are generally achieved by embodiments of this disclosure, which describe precision rate demodulation for a vibrating gyroscope.

A first aspect relates to a circuit for demodulating rate and quadrature signals by applying a unidirectional hysteresis for negative edge. The circuit comprising a first stage configured to generate a first signal that is an amplification of a differential sine wave signal, the differential sine wave signal corresponding to an oscillation of a proof mass of a gyroscope; a gain stage configured to generate a second signal that is an amplification of the first signal from the first stage, a magnitude of the unidirectional hysteresis being controllable through the gain stage; an output stage configured to generate a third signal that is an amplification of the second signal from the gain stage, the third signal being a rail-to-rail square wave signal at an output of the circuit; and a programmable offset circuit configured to provide a programmable negative offset such that a non-inverting signal of the differential sine wave signal decreases further than the inverting signal of the differential sine wave signal for falling edge of the third signal.

A second aspect relates to a system for demodulating rate and quadrature signals. The system comprising a gyroscope configured to detect an oscillation of a proof mass due to a drive motion by generating first signals; a charge-to-voltage converter configured to convert the first signals to a differential sine wave signal, the first signals being charge signals, and the differential sine wave signal being equivalent voltage signals to the first signals; and a drive comparator configured to eliminate false pulses due to high-frequency signals and noise superimposed on top of the differential sine wave signal by applying a unidirectional hysteresis for negative edge. The drive comparator comprising a first stage configured to generate a second signal that is an amplification of the differential sine wave signal, a gain stage configured to generate a third signal that is an amplification of the second signal from the first stage, a magnitude of the unidirectional hysteresis being controllable through the gain stage, an output stage configured to generate an output signal that is an amplification of the third signal from the gain stage, the output signal being a rail-to-rail square wave signal at an output of the drive comparator, and a programmable offset circuit configured to provide a programmable negative offset such that a non-inverting signal of the differential sine wave signal decreases further than the inverting signal of the differential sine wave signal for falling edge of the output signal.

A third aspect relates to a system for demodulating rate and quadrature signals. The system comprising a drive comparator configured to eliminate false pulses due to high-frequency signals and noise superimposed on top of the differential sine wave signal by applying a unidirectional hysteresis for negative edge, comprising a first stage configured to generate a first signal that is an amplification of a differential sine wave signal, the differential sine wave signal corresponding to an oscillation of a proof mass of a gyroscope; a gain stage configured to generate a second signal that is an amplification of the first signal from the first stage, a magnitude of the unidirectional hysteresis being controllable through the gain stage; an output stage configured to generate a third signal that is an amplification of the second signal from the gain stage, the third signal being a rail-to-rail square wave signal at an output of the drive comparator; and a programmable offset circuit configured to provide a programmable negative offset such that a non-inverting signal of the differential sine wave signal decreases further than the inverting signal of the differential sine wave signal for falling edge of the third signal; and a phase-locked loop (PLL) circuit and a phase frequency extractor (PFE) circuit coupled to the drive comparator and configured to generate demodulation signals based on the third signal.

Embodiments can be implemented in hardware, software, or any combination thereof.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise. Various embodiments are illustrated in the accompanying drawing figures, where identical components and elements are identified by the same reference number, and repetitive descriptions are omitted for brevity.

Variations or modifications described in one of the embodiments may also apply to others. Further, various changes, substitutions, and alterations can be made herein without departing from the spirit and scope of this disclosure as defined by the appended claims.

Rate and quadrature signals are coherently demodulated when acquiring a high-precision rate signal within a gyroscope, particularly for high-end Inertial Measurement Unit (IMU) applications. It is advantageous for the demodulation process to ensure that the jitter and the delay associated with the demodulation clock are kept to a minimum, regardless of variations in processing conditions or temperature fluctuations. Any phase error or jitter within the demodulation signal can lead to several undesirable effects, such as the introduction of offset, offset drift, sensitivity drift, and increased noise in the output. Therefore, it is advantageous to significantly minimize the errors to maintain the integrity of the gyroscope measurements and ensure their suitability for precision applications.

Aspects of this disclosure enhance the accuracy of demodulating signals corresponding to angular acceleration (rate) and quadrature, ensuring consistent performance despite variations in process and temperature conditions. By addressing the challenges associated with manufacturing inconsistencies and environmental changes, embodiments of the present disclosure aim to provide a stable and reliable method of interpreting the key outputs of gyroscopes.

Figure 1:
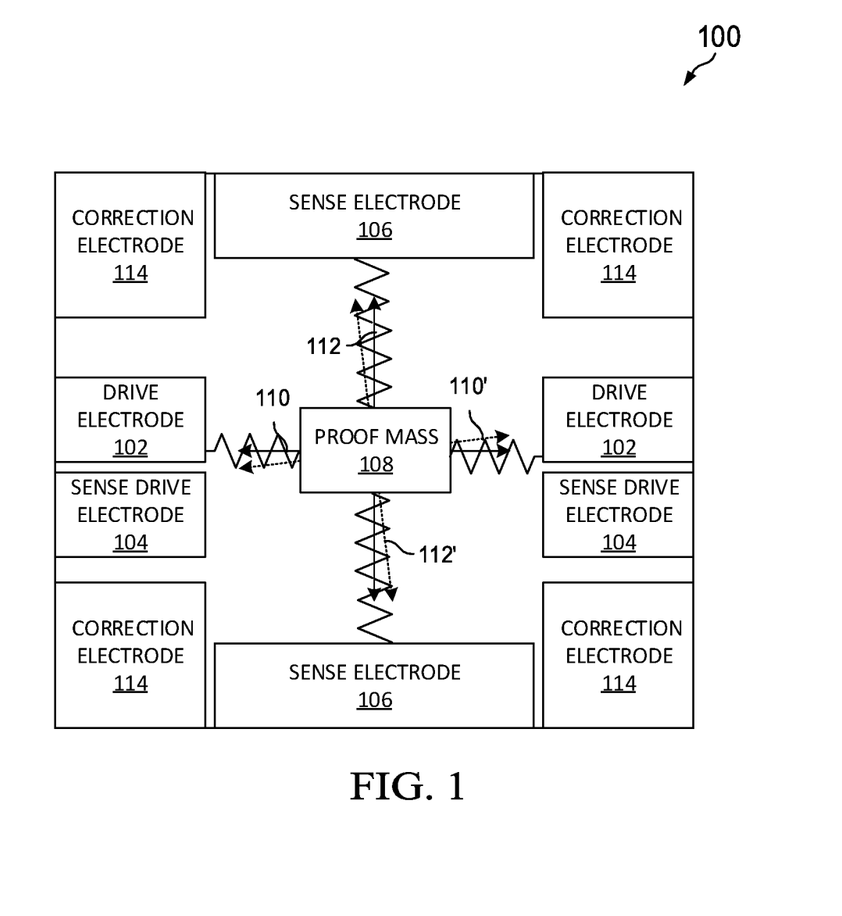
FIG. 1 is a Micro-Electro-Mechanical Systems (MEMS) gyroscope.

FIG. 1 illustrates a Micro-Electro-Mechanical Systems (MEMS) gyroscope 100. MEMS gyroscope 100 includes a pair of drive (D) electrodes 102, a pair of sense drive (SD) electrodes 104, a pair of sense (S) electrodes 106, and a proof mass 108. MEMS gyroscope 100 is configured to measure the rotation rate by exploiting the Coriolis effect.

The drive (D) electrodes 102 set the proof mass 108 into oscillatory motion. They accomplish this by applying an alternating voltage or an electrostatic force to the proof mass 108, causing it to vibrate at a natural or a resonant frequency along the drive axis 110. This vibration creates the conditions under which the Coriolis force can be observed and measured.

The sense drive (SD) electrodes 104 detect changes in the vibration of the proof mass 108 due to the drive motion. This detection can be used in feedback control systems where constant oscillation amplitude is necessary for accurate measurements.

The proof mass 108, a vibrating structure, oscillates along the drive axis 110. When the MEMS gyroscope 100 experiences rotation about the sense axis 112, which, in an ideal MEMS gyroscope, is perpendicular to the drive axis 110, the Coriolis force comes into play. This force results from the rotation and acts perpendicular to the drive axis 110 and the sense axis 112, causing the proof mass 108 to deflect.

Due to the Coriolis force, the mass deflection perpendicular to the rotation and the drive axis alters the capacitance between the proof mass 108 and the sense (S) electrodes 106, which can be read as a Coriolis signal indicative of the rotational rate.

The raw Coriolis signal contains valuable information about the rotation rate but requires processing to isolate and extract this information. Through demodulation, the raw signal is refined to produce what is known as the rate signal. The rate signal represents the device's rotational rate and how fast and in what direction the MEMS gyroscope 100 is rotating.

As noted, in an ideal MEMS gyroscope, the drive axis 110 is perpendicular to the sense axis 112. However, due to various imperfections during manufacturing, the drive axis 110' may not be perfectly perpendicular to the sense axis 112 in a real MEMS gyroscope. The angular imperfection between the two axes leads to unintended parasitic coupling in the sense direction due to the motion of the drive component. The unintended non-orthogonal motion between the drive and sense axis leads to an undesirable quadrature error.

Generally, the quadrature error manifests as a signal 90 degrees out of phase with the Coriolis signal and is several orders larger than the rate signal. Without correction, this quadrature error leads to erroneous outputs known as zero rate outputs (ZRO), ZRO drift, and additional noise within the rate signal. A correction signal is applied to the quadrature correction electrodes 114 to counteract the quadrature error.

The raw (i.e., modulated) Coriolis signal ($F_C$) can be represented by the equation:

$$F_C = -m \times \Omega_0 \times V_0 \times [\cos((\omega_d + \omega_{in})t) + \cos((\omega_d - \omega_{in})t)].$$

In this equation, m is the mass of the proof mass 108, $\Omega_0$ is the amplitude of the angular velocity being measured (i.e., the rate at which the MEMS gyroscope 100 is rotating), $V_0$ is the amplitude of the velocity of the proof mass 108, $\omega_d$ is the drive frequency ($F_d$) at which the proof mass 108 is oscillating (or vibrating), $\omega_{in}$ is the input rate (i.e., the projection of the angular velocity of the system (in which the MEMS gyroscope 100 is operating) onto the sense axis 112, and t is the time variable.

To demodulate and extract the rate and quadrature information from the modulated Coriolis signal ($F_C$), it is multiplied by a coherent demodulation signal (dem)–$F_C \times$dem. The coherent demodulation signal can be represented by the equation: dem=2×[cos(($\omega_d$)t)]. The resulting multiplication of the modulated Coriolis signal ($F_C$) by the coherent demodulation signal (dem) can be represented by the equation:

$$F_C \times dem = \Omega_0 \times (2 \times \cos((\omega_{in})t) + \cos((2 \times \omega_d + \omega_{in})t) + \cos((2 \times \omega_d - \omega_{in})t).$$

Conventionally, the process of demodulating the raw Coriolis signal ($F_C$) includes generating a drive frequency signal ($F_d$) using a high-speed comparator. The drive frequency signal ($F_d$) is processed through a glitch masking block to produce a clean demodulation clock by filtering out unwanted noise and irregularities (i.e., glitches). However, this method has its drawbacks. The glitch masking block is known to exhibit significant variations in performance across a range of temperatures, leading to a lack of precision in its output. As a result, the inconsistency inherent to the glitch masking block introduces variability into the demodulation clock. This variability can adversely affect the raw Coriolis signal (FC) demodulation, resulting in inaccuracies when determining the rate and quadrature information necessary for high-precision applications.

In embodiments, the quadrature correction electrodes 114 may be capacitive, resistive loads, or a combination thereof. Quadrature correction electrodes 114 are configured to mitigate the quadrature error in MEMS gyroscope 100. They are not used to detect or measure rotation but to nullify or cancel out the unwanted quadrature error to improve the accuracy of the MEMS gyroscope 100.

Quadrature correction electrodes 114 operate after detecting capacitive changes associated with the quadrature motion through the sense (S) electrodes 106. Once this motion is identified, a corrective feedback mechanism is engaged.

The feedback mechanism typically generates a compensation signal to correct the detected quadrature error. The signal is applied as a voltage to the quadrature correction electrodes 114, which create electrostatic forces to counteract the unwanted quadrature motion upon the proof mass 108. The magnitude and phase of the compensation signal can be adjusted through a manual tuning process or with an automated control system, which could be either open-loop or closed-loop.

Typically, quadrature correction electrodes 114 are operated in pairs to create differential electrostatic forces through the application of voltages. For example, a first voltage ($V_{Q1}$) may be applied to one of the correction electrodes 114 in a pair to create an attractive force, while a second voltage ($V_{Q2}$) is applied—which can be of opposite polarity to create a repulsive force or a different magnitude of an attractive force—to the other one of the quadrature correction electrodes 114 in the pair. The differential voltage applied to the pair of quadrature correction electrodes 114 is represented as: ($V_{Q1}-V_{Q2}$), whereas the common-mode voltage applied to the pair of quadrature correction electrodes 114 is represented as ($V_{Q1}+V_{Q2}$)/2.

The electrostatic force ($F_{QC}$) can be represented by the equation, $$F_{QC} \approx \left[V_{ROT} - \frac{(V_{Q1} + V_{Q2})}{2}\right] \times (V_{Q1} - V_{Q2}),$$

where $V_{ROT}$ is the rotor voltage. The rotor voltage is an electric potential (i.e., static common-mode voltage) applied to the rotor or proof mass 108.

The continuous cancellation of quadrature error with high precision becomes advantageous for the high-fidelity operation of the MEMS gyroscope 100. This cancellation is maintained over the product's entire lifetime while accommodating variations in manufacturing processes and temperature changes.

Figure 2:
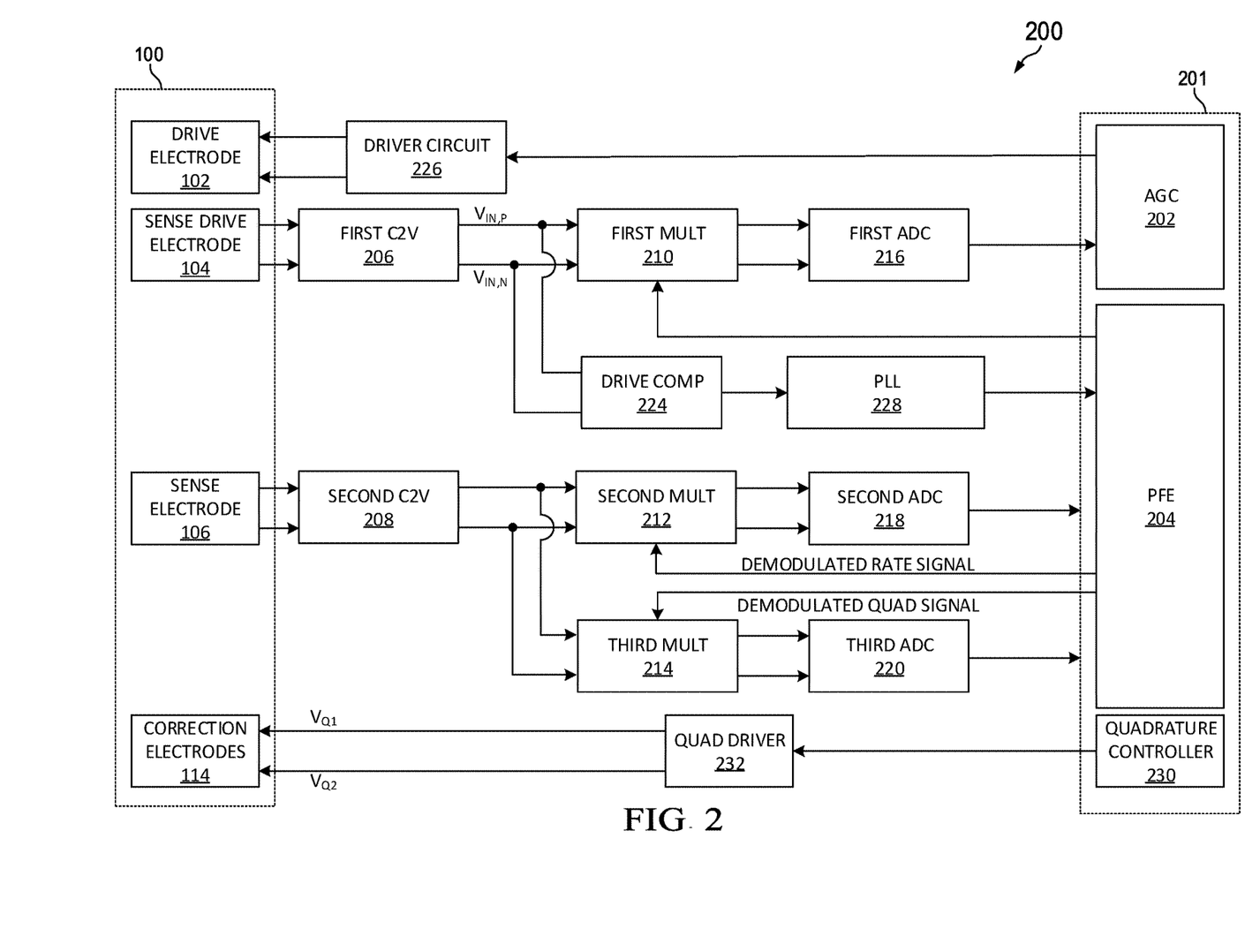
FIG. 2 is a block diagram of an embodiment system.

FIG. 2 illustrates a block diagram of an embodiment system 200. System 200 includes the MEMS gyroscope 100, a digital circuit 201, a first charge-to-voltage (C2V) converter 206, a second C2V converter 208, a first multiplier 210, a second multiplier 212, a third multiplier 214, a first analog-to-digital converter (ADC) 216, a second ADC 218, a third ADC 220, a drive comparator 224, a driver circuit 226, a phase-locked loop (PLL) circuit 228, and a quadrature driver 232, which may (or may not) be arranged as shown.

The digital circuit 201 includes an automatic gain control (AGC) circuit 202, a phase frequency extractor (PFE) circuit 204, and a quadrature controller 230. System 200 may include additional components that are not shown. For example, the digital circuit 201 may include a controller that receives the measurements from the second ADC 218 and the third ADC 220. As another example, a band pass filter or a high pass filter may be arranged immediately before the drive comparator 224 to filter out high-frequency signals or higher harmonics of the resonance frequency ($F_d$).

AGC circuit 202 is configured to regulate the amplitude of vibrations of the proof mass 108 in the MEMS gyroscope 100 to maintain the precision of the measurements. AGC circuit 202 produces a digital control signal to the driver circuit 226. The driver circuit 226 generates an analog differential control signal from the digital control signal. The analog differential control signal is fed to the drive (D) electrodes 102 of the MEMS gyroscope 100 to control the oscillation of the proof mass 108.

The sense drive (SD) electrodes 104 detect variations in the vibration amplitude of the proof mass 108 caused by the drive motion. The detected changes are used for the feedback control mechanisms to sustain a constant oscillation amplitude, ensuring accurate and consistent measurements from the MEMS gyroscope 100.

The analog signal from the sense drive (SD) electrodes 104, representing the detected changes, is directed to the first C2V converter 206. The first C2V converter 206 is configured to transform the analog charge signals into equivalent voltage signals ($V_{IN,P}$ and $V_{IN,N}$) more suitable for subsequent electronic processing.

Following conversion, the voltage signal outputs ($V_{IN,P}$ and $V_{IN,N}$) from the first C2V converter 206 are supplied to the first multiplier 210. Concurrently, the first multiplier 210 receives a second input, a digital signal from the PFE circuit 204. PFE circuit 204 alters the reference signal frequency to align it with the operational needs of system 200.

The first multiplier 210 blends the two signals—the converted voltage from the first C2V converter 206 and the digital signal from the PFE circuit 204—to produce an output that carries information about the motion of the proof mass 108.

The product signal from the first multiplier 210 is conveyed to the first ADC 216. The first ADC 216 is configured to digitize the analog signal from the first multiplier 210 so that digital circuits can process it. The digital output from the first ADC 216 is provided to the AGC circuit 202 as part of a feedback control loop.

Within this feedback loop, the AGC circuit 202 analyzes the digital information given by the first ADC 216 to gauge whether adjustments are necessary. If so, the AGC circuit 202 modifies its digital output to the driver circuit 226 accordingly, creating a closed-loop system that maintains stable and precise control over the vibration amplitude of the drive (D) electrodes 102. This closed-loop system ensures that the MEMS gyroscope 100 functions with a high degree of accuracy.

To ensure the high precision and stability of the MEMS gyroscope 100 across different processes and temperatures throughout its lifespan, it is advantageous to operate it at resonance while maintaining a tightly controlled drive amplitude. Correcting any quadrature error present in system 200 allows for obtaining a dependable rate signal. The valuable data regarding this is encapsulated within the sine wave output produced by the sense (S) electrodes 106. This sine wave must undergo demodulation and be digitized for further use.

The sense drive (SD) electrodes 104 output a sine wave signal. The amplitude of this waveform is directly proportional to the drive applied to the MEMS gyroscope 100, and its frequency matches the resonance frequency of the MEMS drive.

The voltage signal outputs ($V_{IN,P}$ and $V_{IN,N}$) from the first C2V converter 206 are additionally provided to the drive comparator 224 transforms the sine wave into a square wave at the same resonance frequency. The drive comparator 224 is configured to eliminate false pulses due to high-frequency signals and noise that may be superimposed on top of the input signal. In embodiments, the noise ranges from twice the resonance frequency (i.e., $2 \times F_d$) to ten times the resonance frequency (i.e., $10 \times F_d$).

In embodiments, the drive comparator 224 includes a unidirectional (only for falling edge) hysteresis through a latch circuit, enabled after a rising edge at the output signal of the drive comparator 224.

The square wave signal is the input for the PLL circuit 228. PLL circuit 228 is configured to generate multiples of the resonance frequency. The PFE circuit 204 receives the output signal from the PLL circuit 228. The PFE circuit 204 is configured to phase shift and create different phases for rate and quadrature data from the output signal of the PLL circuit 228, which are then utilized by the PFE circuit 204 to create demodulation signals.

In embodiments, PFE circuit 204 is configured to receive a first clock signal at the resonance frequency ($F_d$) and a second clock signal at higher harmonics of $F_d$ (e.g., $1024 \times F_d$), depending on the resolution needed for phase correction and trimming.

The analog sine wave from the sense drive (SD) electrodes 104, which flags variable amplitude based on whether the MEMS gyroscope 100 is in startup or normal mode and is accompanied by higher order harmonics of the resonance frequency, as well as noise, is transformed into a square wave by the drive comparator 224. The drive comparator 224 generates the square wave signal at the resonance frequency by processing the input differential sine wave. The drive comparator 224 is designed to be high-speed to prevent the propagation delay from causing any demodulation errors—such discrepancies are typically addressed during production trimming to ensure that they do not contribute to further errors over the operational life of the MEMS gyroscope 100.

False transitions caused by input noise can produce incorrect resonance frequency pulses, compromising the precision required for proper demodulation. Comparator hysteresis is set for the falling edge to negate the potential effects of the higher-order resonance frequency and any noise superimposed on the resonance frequency sine signal. System 200 can effectively reject unwanted signals by programming required hysteresis and compensating propagation delay at the manufacturing stage, ensuring the MEMS gyroscope 100 functions correctly.

The demodulation signals from the PFE circuit 204 are applied to the first multiplier 210 in the path of the sense drive (SD) electrode, and the second multiplier 212 and the third multiplier 214 in the path of the sense (S) electrode.

The demodulation signal for the sense drive (SD) electrodes 104 is the resonance frequency ($F_d$), which is fed into the feedback control loop at the first multiplier 210. This allows the AGC circuit 202 to provide a digital signal to the driver circuit 226 and keep the MEMS gyroscope 100 tuned to its resonant frequency and at the desired amplitude level.

The sense (S) electrodes 106 carries information about the rate of movement and the quadrature-phase, necessitating demodulation by an appropriate phase signal to extract this information. The demodulated rate signal ($RATE_S$) for the sense (S) electrodes 106 takes the form of a cosine function ($RATE_S = \cos((\omega_d)t)$, where $\omega_d$ is the angular drive frequency of the MEMS gyroscope 100. The demodulated rate signal ($RATE_S$) for the sense (S) electrodes 106 indicates angular velocity. It is provided as an input for the second multiplier 212. A second input of the second multiplier 212 is the output of the sense (S) electrodes 106. The output of the second multiplier 212 is fed to the second ADC 218 as a digital signal indicating the rate signal.

The demodulated quadrature signal ($QUAD_S$) for the sense (S) electrodes 106 takes the form of a sine function ($QUAD_S = \sin d((\omega_d)t)$). The demodulated quadrature signal ($QUAD_S$) for the sense (S) electrodes 106 is used to evaluate and correct the quadrature errors within the MEMS gyroscope 100, contributing to a stable Zero Rate Level (ZRL) and minimizing rate noise. The demodulated quadrature signal ($QUAD_S$) is provided as an input to the third multiplier 214. A second input of the third multiplier 214 is the output of the sense (S) electrodes 106. The output of the third multiplier 214 is fed to the third ADC 220 as a digital signal indicating the quadrature error.

Based on the digital signal from the third ADC 220 indicating the MEMS gyroscope's quadrature error, the quadrature controller 230 provides a digital signal to the quadrature driver 232 to correct the quadrature error through the quadrature correction electrodes 114.

The quadrature driver 232 generates a signal from the digital signal, a first voltage ($V_{Q1}$) and a second voltage ($V_{Q2}$), which are applied to a respective one of the pair of quadrature correction electrodes 114 to correct the detected quadrature error.

Figure 3:
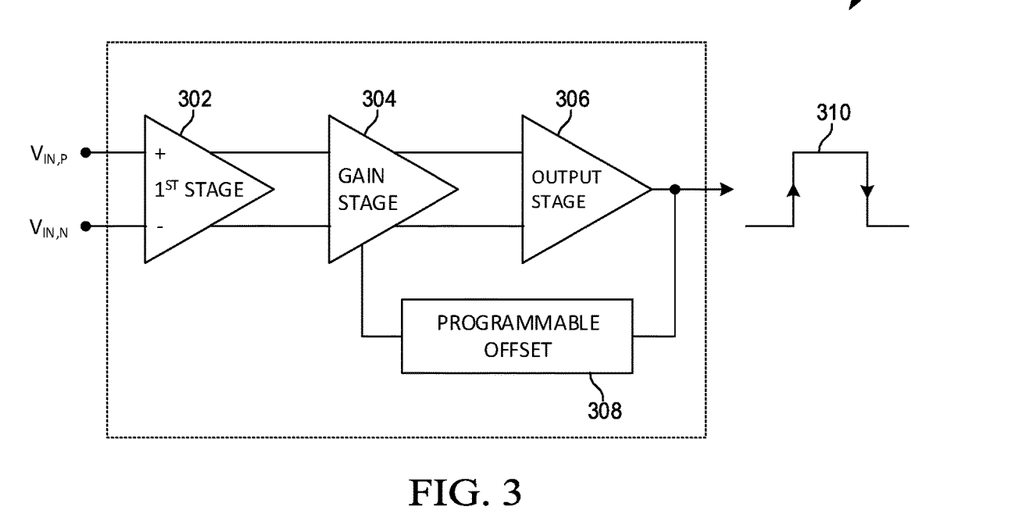
FIG. 3 is a block diagram of an embodiment drive comparator.

FIG. 3 illustrates a block diagram of an embodiment drive comparator 300, which may be implemented as drive comparator 224 in system 200. Drive comparator 300 is configured to sense the drive frequency ($F_d$) signal and convert it into a square wave signal 310 at its output. Drive comparator 300 includes a first stage 302, a gain stage 304, an output stage 306, and a programmable offset circuit 308, which may (or may not) be arranged as shown. Drive comparator 300 may include additional components that are not shown, such as one or more filter circuits.

The first stage 302 is configured to receive and amplify the input differential sine wave ($V_{IN,P}$ and $V_{IN,N}$). The gain stage 304 amplifies the initial gain from the first stage 302 using latches to increase the transconductance and operational speed. The output stage 306 is configured as a third amplification stage, which delivers a rail-to-rail square wave signal 310 at the output of the drive comparator 300. A feedback mechanism using the programmable offset circuit 308 introduces a programmable negative offset using, for example, a switch that adds current to the negative input ($V_{IN,N}$), resulting in the positive input ($V_{IN,P}$) to decrease further than the negative input ($V_{IN,N}$) for a falling edge to be produced at the square wave signal 310.

In embodiments, current is added to one side of the latch (i.e., the first latch 528 in FIG. 5) through the gain stage 304 or by skewing the latch to one side by adding more devices (e.g., through switches). The additional current creates an asymmetry in the latch, resulting in a requirement for a higher threshold of gate-to-source voltage ($V_{GS}$) on the negative side to trigger the latch to flip, effectively introducing an offset to the negative input ($V_{IN,N}$). Moreover, the magnitude of the current introduced or the number of devices added can be adjusted (through the switches) after the output's rising edge, thereby allowing for the programming of the hysteresis associated with the negative input ($V_{IN,N}$).

The negative offset can be achieved through various methods such as integrating additional input devices to the negative input ($V_{IN,N}$) side, installing more devices on the negative input ($V_{IN,N}$) side of the latch, or by introducing extra current on that side. This feedback-based offset can be adjusted through a series of switches that affect the input devices at the negative input ($V_{IN,N}$), the gain stage 304, or by altering the current at the input of the gain stage 304.

Generally, it is advantageous for a high-precision gyroscope to be operated at resonance with a precisely controlled drive amplitude to ensure that it remains stable throughout its lifespan, regardless of process variations and temperature fluctuations. Additionally, the system must address and correct quadrature errors to obtain a dependable rate signal. As discussed above, system 200 generates a sine wave signal ($V_{IN,P}$ and $V_{IN,N}$) via sense drive (SD) electrodes 104 of the MEMS gyroscope 100 and the first C2V 206.

Accordingly, the sense (S) electrodes 106 provide the quadrature and rate information, whereas the sense drive (SD) electrodes 104 supply the drive information. The drive information encompasses the resonance frequency ($F_d$), as well as the amplitude of the oscillation of the proof mass 108 on the drive axis 110.

In embodiments, the drive comparator 300 is configured to transform the analog sine wave ($V_{IN,P}$ and $V_{IN,N}$) into a square wave signal 310. The drive comparator 300 creates the square wave signal 310 at the drive frequency ($F_d$) by processing the input differential sine wave ($V_{IN,P}$ and $V_{IN,N}$), which may present variable amplitude based on the operational mode of the MEMS gyroscope 100—either startup or normal functioning. The differential input sine wave ($V_{IN,P}$ and $V_{IN,N}$) can also include higher-order harmonics of the drive frequency ($F_d$) and noise superimposed upon the drive frequency ($F_d$) signal. Accordingly, the drive comparator 300 operates at high speed to minimize false transitions that could arise from input noise.

Any propagation delay by the drive comparator 300 can directly translate to errors in demodulation, which can be adjusted during production to avoid further variations throughout the operational lifetime of the MEMS gyroscope 100.

In embodiments, the drive comparator 300 includes unidirectional hysteresis to reject higher-order harmonics of the drive frequency ($F_d$) and noise superimposed upon the drive frequency ($F_d$) signal. The noise can create false pulses (i.e., glitches) in the square wave signal 310. A critical concern can be the noise that occurs during the zero crossing. When the input differential sine wave ($V_{IN,P}$ and $V_{IN,N}$) is converted to the square wave signal 310 at the rising edge of the zero crossing, and if subsequent circuits are sensitive only to this rising edge, the sensitivity to noise present at the falling edge is effectively removed. However, to prevent any false triggering at the falling edge, the unidirectional hysteresis is added to that edge to ensure that spurious responses due to noise at both edges of the signal are minimized.

Accordingly, the unidirectional hysteresis counteracts any false transitions that can produce incorrect drive frequency ($F_d$) signal square waves, ensuring that the drive frequency ($F_d$) signal is precise for proper demodulation. In embodiments, the hysteresis is programmed during production.

In embodiments, the drive comparator 300 is equipped with the unidirectional hysteresis tailored to the falling edge by integrating a latch enabled after the rising edge of the square wave signal 310. Advantageously, the inclusion prevents false triggering without contributing to an increase in propagation delay. The subsequent circuit components following the drive comparator 300 respond solely to the rising edge of the square wave signal 310, yielding a clear and clean output drive frequency ($F_d$) signal. The output drive frequency ($F_d$) signal is subjected to a phase shift using a high-speed clock reference. This phase shift is executed to demodulate the rate and quadrature signals. The phase shift aligns the output signal with the clock reference to accurately decode the information within the rate and quadrature signals as part of the demodulation process.

In embodiments, a programmable offset circuit 308 is implemented using a latch within the gain stage 304. In embodiments, adjustments to the offset magnitude can be made by varying the number of fingers in the latch or modifying the current that flows through it. In embodiments, the direction of control for the latch is derived from the feedback received from the square wave signal 310 at the output stage 306, activated at its rising edge. As the offset adjustment by the programmable offset circuit 308 occurs internally within the drive comparator 300, it does not influence the input signal of the drive comparator 300, ensuring that input integrity is maintained.

In embodiments, the drive comparator 300 can experience propagation delay, yet on the rising edge, this delay is significantly lower than the signal frequency, and it can be mitigated during production through trimming processes. However, if an offset is introduced by altering the latch strength through the programmable offset circuit 308, as previously disclosed, the propagation delay may be subject to change. This variability is a consequence of two factors: the precision of component matching and the magnitude of the bias current flowing through the latch. As temperature variations can impact the bias current and component matching, they can affect the propagation delay, potentially leading to errors in demodulation.

For example, with an input signal frequency of 20 kHz, the latch could introduce an additional propagation delay of around 10 ns, where the propagation delay is the time from input zero crossing to output transition. Should the latch strength fluctuate by 50% due to temperature variations, this would result in the propagation delay changing by a comparable extent, at a minimum of 50%.

Accordingly, compensation is initially made for any propagation delay inherent to the drive comparator 300 during production. However, changes in the propagation delay over time and, with varying temperatures, can remain uncompensated. This lack of adjustment can result in a phase error within the PFE circuit 204. The phase error, in turn, can cause demodulation errors that lead to inaccurate rate and quadrature information. The consequence of such inaccuracies can manifest as increased noise and Zero-Rate Output (ZRO) movement within the system.

The input noise present during the rising transition may cause variations in the rising threshold from one cycle to the next. For example, in one instance, the threshold might register at the zero-crossing point with a positive offset of +1 mV. In contrast, it could detect a −1 mV offset in another instance, yielding an effect similar to a clock jitter. By incorporating a unidirectional hysteresis-adding offset after the rising threshold-inconsistencies can be minimized, preventing the occurrence of high-frequency pulses, which can be attributed to input noise at the zero crossing. Avoiding these high-frequency false pulses is advantageous, as they can lead to undesirable effects in the PLL circuit 228. For instance, if the output of the drive comparator 300, at 20 kHz, were to encounter additional high-frequency components within its bandwidth, the PLL circuit 228 would react to the high-frequency components, producing high-frequency multiples. This kind of interference can disrupt the stability of the PLL loop and subsequently contribute to demodulation errors or instability.

Figure 4:
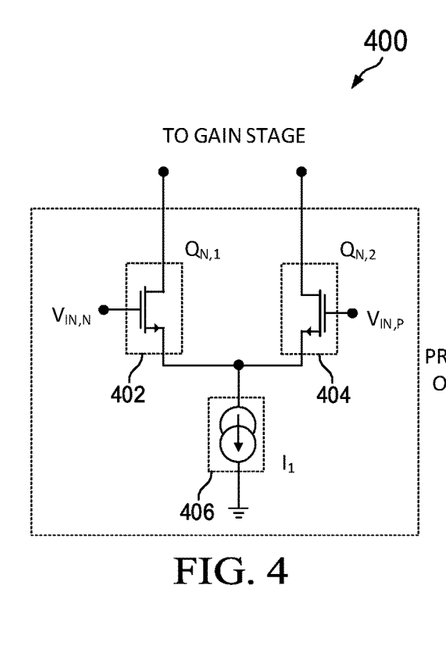
FIG. 4 is a schematic of an embodiment first stage.

FIG. 4 illustrates a schematic of an embodiment first stage 400, which may be implemented as the first stage 302 in drive comparator 300. First stage 400 includes a first n-channel transistor ($Q_{N,1}$) 402, a second n-channel transistor ($Q_{N,2}$) 404, and a current source 406, which may (or may not) be arranged as shown. First stage 400 may include additional components that are not shown. The first stage 400 is configured to receive and amplify the input differential sine wave ($V_{IN,P}$ and $V_{IN,N}$), provided to the gain stage 304.

In embodiments, the first n-channel transistor ($Q_{N,1}$) 402 and the second n-channel transistor ($Q_{N,2}$) 404 are metal-oxide-semiconductor field-effect transistors (MOSFETs).

In embodiments, the current source 406 is implemented using an n-channel transistor (e.g., NMOS) with a gate bias to supply a corresponding bias current. A first terminal of the current source 406 is coupled to reference ground.

The source terminals of the first n-channel transistor ($Q_{N,1}$) 402 and the second n-channel transistor ($Q_{N,2}$) 404 are coupled to a second terminal of the current source 406. The gate terminal of the first n-channel transistor ($Q_{N,1}$) 402 is coupled to the negative input ($V_{IN,N}$) of the input differential sine wave. The gate terminal of the second n-channel transistor ($Q_{N,2}$) 404 is coupled to the positive input ($V_{IN,P}$) of the input differential sine wave. The drain terminals of the first n-channel transistor ($Q_{N,1}$) 402 and the second n-channel transistor ($Q_{N,2}$) 404 are coupled to the gain stage 304.

Figure 5:
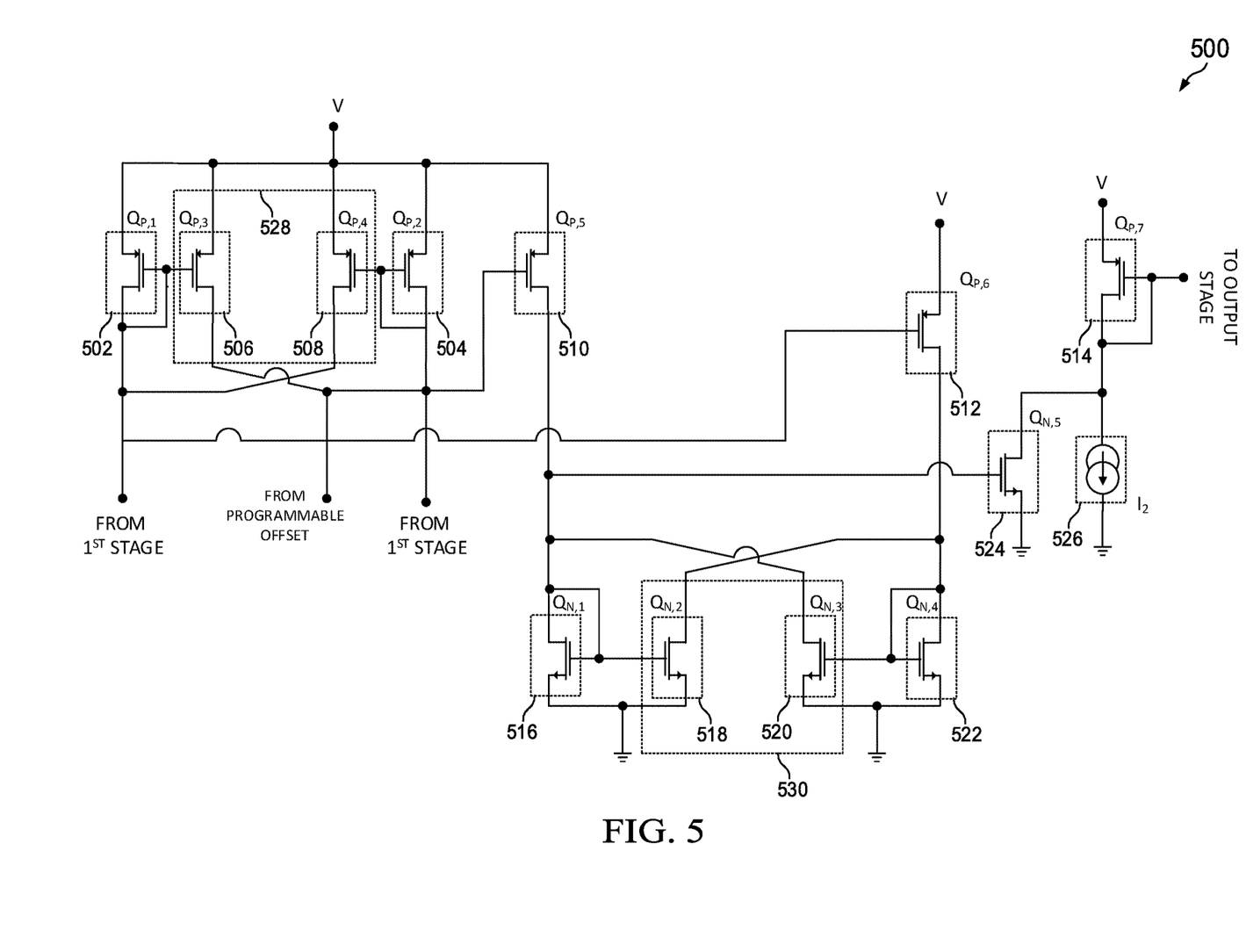
FIG. 5 is a schematic of an embodiment gain stage.

FIG. 5 illustrates a schematic of an embodiment gain stage 500, which may be implemented as the gain stage 304 in drive comparator 300. Gain stage 500 includes a first p-channel transistor ($Q_{P,1}$) 502, a second p-channel transistor ($Q_{P,2}$) 504, a third p-channel transistor ($Q_{P,3}$) 506, a fourth p-channel transistor ($Q_{P,4}$) 508, a fifth p-channel transistor ($Q_{P,5}$) 510, a sixth p-channel transistor ($Q_{P,6}$) 512, a seventh p-channel transistor ($Q_{P,7}$) 514, a first n-channel transistor ($Q_{N,1}$) 516, a second n-channel transistor ($Q_{N,2}$) 518, a third n-channel transistor ($Q_{N,3}$) 520, a fourth n-channel transistor ($Q_{N,4}$) 522, a fifth n-channel transistor ($Q_{N,5}$) 524, and a current source 526, which may (or may not) be arranged as shown. Gain stage 500 amplifies the initial gain from the first stage 302 to increase the transconductance and operational speed.

In embodiments, the first p-channel transistor ($Q_{P,1}$) 502, the second p-channel transistor ($Q_{P,2}$) 504, the third p-channel transistor ($Q_{P,3}$) 506, the fourth p-channel transistor ($Q_{P,4}$) 508, the fifth p-channel transistor ($Q_{P,5}$) 510, the sixth p-channel transistor ($Q_{P,6}$) 512, the seventh p-channel transistor ($Q_{P,7}$) 514, the first n-channel transistor ($Q_{N,1}$) 516, the second n-channel transistor ($Q_{N,2}$) 518, the third n-channel transistor ($Q_{N,3}$) 520, the fourth n-channel transistor ($Q_{N,4}$) 522, and the fifth n-channel transistor ($Q_{N,5}$) 524 are metal-oxide-semiconductor field-effect transistors (MOSFETs).

In embodiments, the current source 526 is implemented using an n-channel transistor (e.g., NMOS) with a gate bias to supply a corresponding bias current. A first terminal of the current source 526 is coupled to reference ground.

The first p-channel transistor ($Q_{P,1}$) 502, the second p-channel transistor ($Q_{P,2}$) 504, the seventh p-channel transistor ($Q_{P,7}$) 514, the first n-channel transistor ($Q_{N,1}$) 516, and the fourth n-channel transistor ($Q_{N,4}$) 522 are configured as a diode-connected transistor (i.e., having a drain-to-gate connection).

The source terminals of the first p-channel transistor ($Q_{P,1}$) 502, the second p-channel transistor ($Q_{P,2}$) 504, the third p-channel transistor ($Q_{P,3}$) 506, the fourth p-channel transistor ($Q_{P,4}$) 508, the fifth p-channel transistor ($Q_{P,5}$) 510, the sixth p-channel transistor ($Q_{P,6}$) 512, and the seventh p-channel transistor ($Q_{P,7}$) 514 are coupled to the supply voltage (V).

The gate terminal of the first p-channel transistor ($Q_{P,1}$) 502 is coupled to the gate terminal of the third p-channel transistor ($Q_{P,3}$) 506. The gate terminal of the second p-channel transistor ($Q_{P,2}$) 504 is coupled to the gate terminal of the fourth p-channel transistor ($Q_{P,4}$) 508.

The drain terminal of the first p-channel transistor ($Q_{P,1}$) 502, the drain terminal of the fourth p-channel transistor ($Q_{P,4}$) 508, and the gate terminal of the sixth p-channel transistor ($Q_{P,6}$) 512 are coupled to the drain terminal of the first n-channel transistor ($Q_{N,1}$) 402.

The drain terminal of the second p-channel transistor ($Q_{P,2}$) 504, the drain terminal of the third p-channel transistor ($Q_{P,3}$) 506, and the gate terminal of the fifth p-channel transistor ($Q_{P,5}$) 510 are coupled to the drain terminal of the second n-channel transistor ($Q_{N,2}$) 404.

The third p-channel transistor ($Q_{P,3}$) 506 and the fourth p-channel transistor ($Q_{P,4}$) 508 form a first latch 528, controlling the flow of current and the logic levels within the first latch 528.

The source terminals of the first n-channel transistor ($Q_{N,1}$) 516, the second n-channel transistor ($Q_{N,2}$) 518, the third n-channel transistor ($Q_{N,3}$) 520, the fourth n-channel transistor ($Q_{N,4}$) 522, and the fifth n-channel transistor ($Q_{N,5}$) 524 are coupled to the reference ground.

The gate terminal of the first n-channel transistor ($Q_{N,1}$) 516 is coupled to the gate terminal of the second n-channel transistor ($Q_{N,2}$) 518. The gate terminal of the third n-channel transistor ($Q_{N,3}$) 520 is coupled to the gate terminal of the fourth n-channel transistor ($Q_{N,4}$) 522.

The drain terminal of the first n-channel transistor ($Q_{N,1}$) 516, the drain terminal of the third n-channel transistor ($Q_{N,3}$) 520, and the gate terminal of the fifth n-channel transistor ($Q_{N,5}$) 524 are coupled to the drain terminal of the fifth p-channel transistor ($Q_{P,5}$) 510.

The drain terminal of the second n-channel transistor ($Q_{N,2}$) 518 and the drain terminal of the fourth n-channel transistor ($Q_{N,4}$) 522 are coupled to the drain terminal of the sixth p-channel transistor ($Q_{P,6}$) 512.

The shared node between the gate and drain terminals of the seventh p-channel transistor ($Q_{P,7}$) 514 are coupled to a second terminal of the current source 526 and the drain terminal of the fifth n-channel transistor ($Q_{N,5}$) 524.

The second n-channel transistor ($Q_{N,2}$) 518 and the third n-channel transistor ($Q_{N,3}$) 520 form a second latch 530, controlling the flow of current and the logic levels within the second latch 530.

The gain stage 500 multiplies the gain from the first stage 302 with the first and second latch to increase the transconductance/speed of the drive comparator 300.

Figure 6:
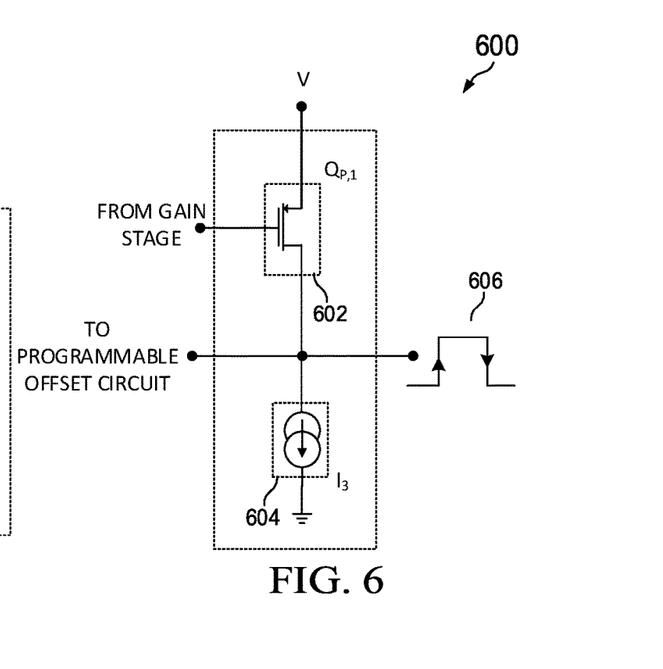
FIG. 6 is a schematic of an embodiment output stage.

FIG. 6 illustrates a schematic of an embodiment output stage 600, which may be implemented as the output stage 306 in drive comparator 300. Output stage 600 includes a first p-channel transistor ($Q_{P,1}$) 602 and a current source 604, which may (or may not) be arranged as shown. Output stage 600 may include additional components that are not shown. Output stage 600 is configured as a third amplification stage, which delivers a rail-to-rail square wave signal 606 at the output of the drive comparator 300.

In embodiments, the p-channel transistor ($Q_{P,1}$) 602 is a metal-oxide-semiconductor field-effect transistor (MOSFET).

In embodiments, the current source 604 is implemented using an n-channel transistor (e.g., NMOS) with a gate bias to supply a corresponding bias current. A first terminal of the current source 604 is coupled to the reference ground.

The source terminal of the first p-channel transistor ($Q_{P,1}$) 602 is coupled to the supply voltage (V). The gate terminal of the first p-channel transistor ($Q_{P,1}$) 602 is coupled to the gain stage 304. In particular, the gate terminal of the first p-channel transistor ($Q_{P,1}$) 602 is coupled to the shared node between the gate and drain terminals of the seventh p-channel transistor ($Q_{P,6}$) 514. The drain terminal of the first p-channel transistor ($Q_{P,1}$) 602 is coupled to a second terminal of the current source 604.

Figure 7:
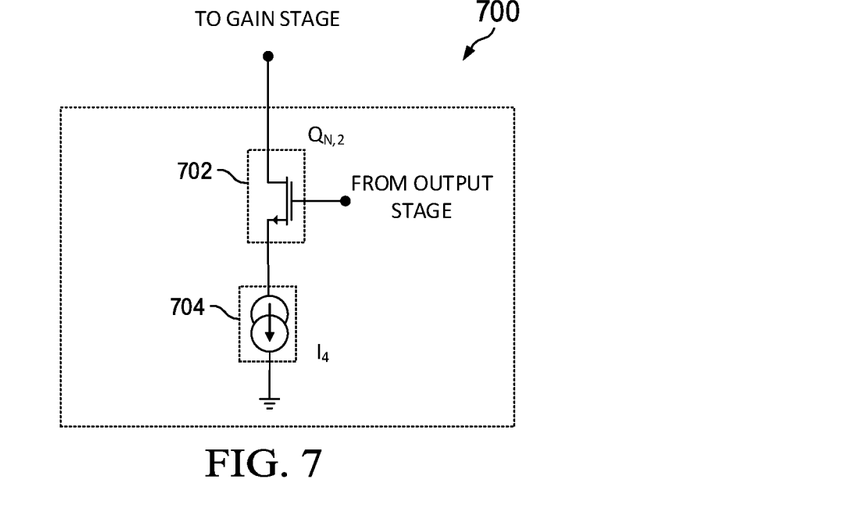
FIG. 7 is a schematic of an embodiment programmable offset circuit.

FIG. 7 illustrates a schematic of an embodiment programmable offset circuit 700, which may be implemented as the programmable offset circuit 308 in drive comparator 300. Programmable offset circuit 700 includes a first n-channel transistor ($Q_{N,1}$) 702 and a current source 704, which may (or may not) be arranged as shown. Programmable offset circuit 700 may include additional components that are not shown. Programmable offset circuit 700 is configured to introduce a programmable negative offset that adds current to skew the latch in the gain stage to add more offset to the negative input ($V_{IN,N}$) for falling edge to produce the square wave signal 310.

In embodiments, the first n-channel transistor ($Q_{N,1}$) 702 is implemented as a metal-oxide-semiconductor field-effect transistor (MOSFET).

In embodiments, the current source 704 is implemented using an n-channel transistor (e.g., NMOS) with a gate bias to supply a corresponding bias current. A first terminal of the current source 704 is coupled to reference ground.

The source terminal of the first n-channel transistor ($Q_{N,1}$) 702 is coupled to a second terminal of the current source 704. The gate terminal of the first n-channel transistor ($Q_{N,1}$) 702 is coupled to the output stage 306. In particular, the gate terminal of the first n-channel transistor ($Q_{N,1}$) 702 is coupled to the shared node between the drain terminal of the first p-channel transistor ($Q_{P,1}$) 602 and the current source 604. The drain terminal of the first n-channel transistor ($Q_{N,1}$) is coupled to the gain stage 304. In particular, the drain terminal of the first n-channel transistor ($Q_{N,1}$) is coupled to the shared node between the drain terminal of the first n-channel transistor ($Q_{N,1}$) 402 and the drain terminals of the first p-channel transistor ($Q_{P,1}$) 502 and the fourth p-channel transistor ($Q_{P,4}$) 508.

The first n-channel transistor ($Q_{N,1}$) 702 is configured to enable the first latch 528, which adds the unidirectional hysteresis after the rising edge of the square wave signal 310.

Figure 8:
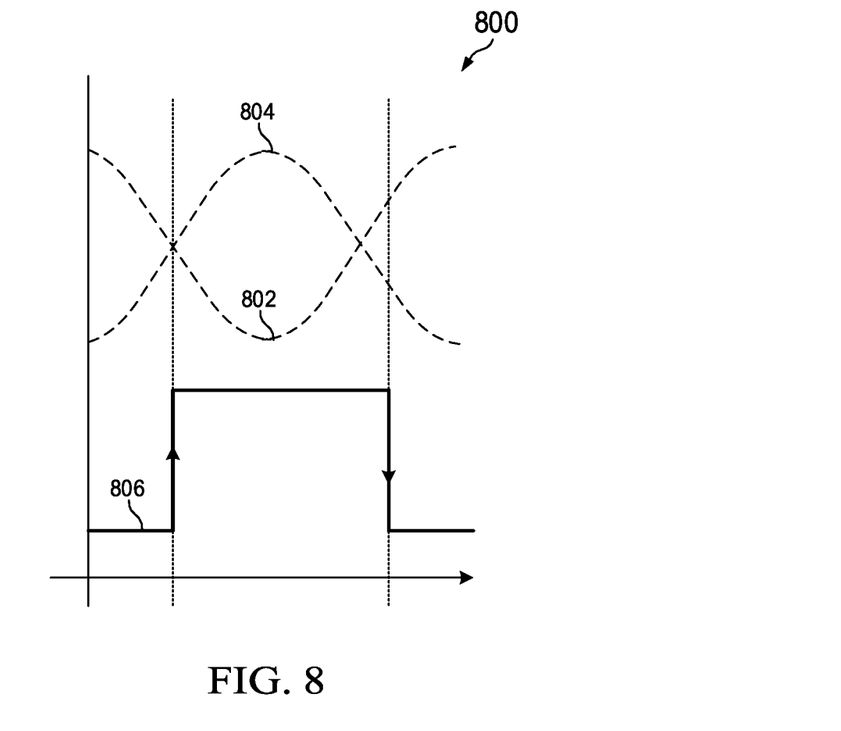
FIG. 8 are plots of embodiment signals.

FIG. 8 illustrates plots of embodiment signals 800. Signals 800 include the negative input ($V_{IN,N}$) of the input differential sine wave 802, the positive input ($V_{IN,P}$) of the input differential sine wave 804, and a square wave signal 806 at the output of the drive comparator 300.

In embodiments, the negative input ($V_{IN,N}$) of the input differential sine wave 802 and the positive input ($V_{IN,P}$) of the input differential sine wave 804 include noise.

As shown, the square wave signal 806 at the output of the drive comparator 300 is defined by its behavior relative to the negative input ($V_{IN,N}$) of the input differential sine wave 802 and the positive input ($V_{IN,P}$) of the input differential sine wave 804. Specifically, the rising edge of the square wave signal 806 occurs when the increasing voltage (i.e., ramping up) of the positive input ($V_{IN,P}$) of the input differential sine wave 804 crosses the decreasing voltage (i.e., ramping down) of the negative input ($V_{IN,N}$) of the input differential sine wave 802.

Conversely, the falling edge of the square wave signal 806 occurs when the decreasing voltage (i.e., ramping down) of the positive input ($V_{IN,P}$) of the input differential sine wave 804 crosses the increasing voltage (i.e., ramping up) of the negative input ($V_{IN,N}$) of the input differential sine wave 802.

It should be noted that the falling edge can vary depending on the hysteresis, but the accuracy of the falling edge is not crucial.

A first aspect relates to a circuit for demodulating rate and quadrature signals by applying a unidirectional hysteresis for negative edge. The circuit comprises a first stage configured to generate a first signal that is an amplification of a differential sine wave signal, the differential sine wave signal corresponding to an oscillation of a proof mass of a gyroscope; a gain stage configured to generate a second signal that is an amplification of the first signal from the first stage, a magnitude of the unidirectional hysteresis being controllable through the gain stage; an output stage configured to generate a third signal that is an amplification of the second signal from the gain stage, the third signal being a rail-to-rail square wave signal at an output of the circuit; and a programmable offset circuit configured to provide a programmable negative offset such that a non-inverting signal of the differential sine wave signal decreases further than the inverting signal of the differential sine wave signal for falling edge of the third signal.

In a first implementation form of the circuit, according to the first aspect as such, the first stage comprises: a first n-channel transistor having a gate terminal coupled to the inverting signal of the differential sine wave signal, a drain terminal of the first n-channel transistor coupled to a first input of the gain stage; a second n-channel transistor having a gate terminal coupled to the non-inverting signal of the differential sine wave signal, a drain terminal of the second n-channel transistor coupled to a second input of the gain stage; and a current source having a first terminal coupled to a shared node between source terminals of the first n-channel transistor and the second n-channel transistor, and a second terminal of the current source coupled to reference ground.

In a second implementation form of the circuit, according to the first aspect as such or any preceding implementation form of the first aspect, the gain stage comprises a plurality of n-channel transistors having source terminals coupled to reference ground; a plurality of p-channel transistors having source terminals coupled to a supply voltage; and a plurality of latches configured to increase a transconductance and operational speed of the circuit.

In a third implementation form of the circuit, according to the first aspect as such or any preceding implementation form of the first aspect, the output stage comprises a p-channel transistor having a source terminal coupled to a voltage source; and a current source having a first terminal coupled to a shared node between the source terminal of the p-channel transistor and an input of the programmable offset circuit.

In a fourth implementation form of the circuit, according to the first aspect as such or any preceding implementation form of the first aspect, the programmable offset circuit comprises a switch; and a current source coupled between the switch and reference ground, wherein the switch, when enabled, provides a negative offset through the current source at an inverted signal of the differential sine wave signal.

In a fifth implementation form of the circuit, according to the first aspect as such or any preceding implementation form of the first aspect, the gyroscope comprises sense drive electrodes configured to generate charge signals, and wherein a charge-to-voltage converter is coupled between the gyroscope and the circuit, the charge-to-voltage converter configured to convert charge signals into the differential sine wave signal.

In a sixth implementation form of the circuit, according to the first aspect as such or any preceding implementation form of the first aspect, the gain stage comprises a pair of latches configured to increase a transconductance and operational speed of the circuit.

A second aspect relates to a system for demodulating rate and quadrature signals. The system comprising a gyroscope configured to detect an oscillation of a proof mass due to a drive motion by generating first signals; a charge-to-voltage converter configured to convert the first signals to a differential sine wave signal, the first signals being charge signals, and the differential sine wave signal being equivalent voltage signals to the first signals; and a drive comparator configured to eliminate false pulses due to high-frequency signals and noise superimposed on top of the differential sine wave signal by applying a unidirectional hysteresis for negative edge. The drive comparator comprising a first stage configured to generate a second signal that is an amplification of the differential sine wave signal, a gain stage configured to generate a third signal that is an amplification of the second signal from the first stage, a magnitude of the unidirectional hysteresis being controllable through the gain stage, an output stage configured to generate an output signal that is an amplification of the third signal from the gain stage, the output signal being a rail-to-rail square wave signal at an output of the drive comparator, and a programmable offset circuit configured to provide a programmable negative offset such that a non-inverting signal of the differential sine wave signal decreases further than the inverting signal of the differential sine wave signal for falling edge of the output signal.

In a first implementation form of the system, according to the second aspect as such, the gyroscope comprises sense drive electrodes configured to generate the first signals.

In a second implementation form of the system, according to the second aspect as such or any preceding implementation form of the second aspect, the system further comprises a phase-locked loop (PLL) circuit configured to receive the third signal and generate multiples of the output signal at its output; and a phase frequency extractor (PFE) circuit configured to receive an output signal from the PLL circuit and generate a rate demodulation phase signal and a quadrature demodulation phase signal.

In a third implementation form of the system, according to the second aspect as such or any preceding implementation form of the second aspect, the first stage comprises a first n-channel transistor having a gate terminal coupled to an inverting input of the differential sine wave signal, a drain terminal of the first n-channel transistor coupled to a first input of the gain stage; a second n-channel transistor having a gate terminal coupled to a non-inverting input of the differential sine wave signal, a drain terminal of the second n-channel transistor coupled to a second input of the gain stage; and a current source having a first terminal coupled to a shared node between source terminals of the first n-channel transistor and the second n-channel transistor, and a second terminal of the current source coupled to reference ground.

In a fourth implementation form of the system, according to the second aspect as such or any preceding implementation form of the second aspect, the gain stage comprises a plurality of n-channel transistors having source terminals coupled to reference ground; a plurality of p-channel transistors having source terminals coupled to a supply voltage; and a plurality of latches configured to increase a transconductance and operational speed of the circuit.

In a fifth implementation form of the system, according to the second aspect as such or any preceding implementation form of the second aspect, the programmable offset circuit comprises an n-channel transistor having a gate terminal coupled to an output of the circuit, a drain terminal of the n-channel transistor coupled to an input of the gain stage; and a current source having a first terminal coupled to a source terminal of the n-channel transistor, a second terminal of the current source coupled to reference ground.

In a sixth implementation form of the system, according to the second aspect as such or any preceding implementation form of the second aspect, the system further includes a phase-locked loop (PLL) circuit configured to receive the third signal and generate multiples of the output signal at its output; and a phase frequency extractor (PFE) circuit coupled to an output of the PLL circuit and configured to generate demodulation signals from multiples of the output signal.

A third aspect relates to a system for demodulating rate and quadrature signals. The system comprising a drive comparator configured to eliminate false pulses due to high-frequency signals and noise superimposed on top of the differential sine wave signal by applying a unidirectional hysteresis at a negative edge, comprising a first stage configured to generate a first signal that is an amplification of a differential sine wave signal, the differential sine wave signal corresponding to an oscillation of a proof mass of a gyroscope; a gain stage configured to generate a second signal that is an amplification of the first signal from the first stage, a magnitude of the unidirectional hysteresis being controllable through the gain stage; an output stage configured to generate a third signal that is an amplification of the second signal from the gain stage, the third signal being a rail-to-rail square wave signal at an output of the drive comparator; and a programmable offset circuit configured to provide a programmable negative offset such that a non-inverting signal of the differential sine wave signal decreases further than the inverting signal of the differential sine wave signal for falling edge of the third signal; and a phase-locked loop (PLL) circuit and a phase frequency extractor (PFE) circuit coupled to the drive comparator and configured to generate demodulation signals based on the third signal.

In a first implementation form of the system, according to the third aspect as such, the PLL circuit is configured to receive the third signal and generate multiples of the output signal at its output. The PFE circuit is coupled to the output of the PLL circuit and is configured to generate a rate demodulation phase signal and a quadrature demodulation phase signal.

In a second implementation form of the system, according to the third aspect as such or any preceding implementation form of the third aspect, the first stage comprises a first n-channel transistor having a gate terminal coupled to an inverting input of the differential sine wave signal, a drain terminal of the first n-channel transistor coupled to a first input of the gain stage; a second n-channel transistor having a gate terminal coupled to a non-inverting input of the differential sine wave signal, a drain terminal of the second n-channel transistor coupled to a second input of the gain stage; and a current source having a first terminal coupled to a shared node between source terminals of the first n-channel transistor and the second n-channel transistor, and a second terminal of the current source coupled to reference ground.

In a third implementation form of the system, according to the third aspect as such or any preceding implementation form of the third aspect, the gain stage comprises a plurality of n-channel transistors having source terminals coupled to reference ground; a plurality of p-channel transistors having source terminals coupled to a supply voltage; and a plurality of latches configured to increase a transconductance and operational speed of the circuit.

In a fourth implementation form of the system, according to the third aspect as such or any preceding implementation form of the third aspect, the programmable offset circuit comprises an n-channel transistor having a gate terminal coupled to an output of the circuit, a drain terminal of the n-channel transistor coupled to an input of the gain stage; and a current source having a first terminal coupled to a source terminal of the n-channel transistor, a second terminal of the current source coupled to reference ground.

In a fifth implementation form of the system, according to the third aspect as such or any preceding implementation form of the third aspect, the system further includes a phase-locked loop (PLL) circuit coupled between the drive comparator and the digital circuit, the PLL circuit configured to receive the third signal and generate multiples at its output.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A circuit for demodulating rate and quadrature signals by applying a unidirectional hysteresis for a negative edge, the circuit comprising:
    a first stage configured to generate a first signal that is an amplification of a differential sine wave signal, the differential sine wave signal corresponding to an oscillation of a proof mass of a gyroscope;
    a gain stage configured to generate a second signal that is an amplification of the first signal from the first stage, a magnitude of the unidirectional hysteresis being controllable through the gain stage;
    an output stage configured to generate a third signal that is an amplification of the second signal from the gain stage, the third signal being a rail-to-rail square wave signal at an output of the circuit; and
    a programmable offset circuit configured to provide a programmable negative offset such that a non-inverting signal of the differential sine wave signal decreases further than the inverting signal of the differential sine wave signal for a falling edge of the third signal.

2. The circuit of claim 1, wherein the first stage comprises:
    a first n-channel transistor having a gate terminal coupled to the inverting signal of the differential sine wave signal, a drain terminal of the first n-channel transistor coupled to a first input of the gain stage;
    a second n-channel transistor having a gate terminal coupled to the non-inverting signal of the differential sine wave signal, a drain terminal of the second n-channel transistor coupled to a second input of the gain stage; and
    a current source having a first terminal coupled to a shared node between source terminals of the first n-channel transistor and the second n-channel transistor, and a second terminal of the current source coupled to reference ground.

3. The circuit of claim 1, wherein the gain stage comprises:
    a plurality of n-channel transistors having source terminals coupled to reference ground;
    a plurality of p-channel transistors having source terminals coupled to a supply voltage; and
    a plurality of latches configured to increase a transconductance and operational speed of the circuit.

4. The circuit of claim 1, wherein the output stage comprises:
    a p-channel transistor having a source terminal coupled to a voltage source; and
    a current source having a first terminal coupled to a shared node between the source terminal of the p-channel transistor and an input of the programmable offset circuit.

5. The circuit of claim 1, wherein the programmable offset circuit comprises:
    a switch; and
    a current source coupled between the switch and reference ground, wherein the switch, when enabled, provides a negative offset through the current source at an inverted signal of the differential sine wave signal.

6. The circuit of claim 1, wherein the gyroscope comprises sense drive electrodes configured to generate charge signals, and wherein a charge-to-voltage converter is coupled between the gyroscope and the circuit, the charge-to-voltage converter configured to convert charge signals into the differential sine wave signal.

7. The circuit of claim 1, wherein the gain stage comprises a pair of latches configured to increase a transconductance and operational speed of the circuit.

8. A system for demodulating rate and quadrature signals, the system comprising:
    a gyroscope configured to detect an oscillation of a proof mass due to a drive motion by generating first signals;
    a charge-to-voltage converter configured to convert the first signals to a differential sine wave signal, the first signals being charge signals, and the differential sine wave signal being equivalent voltage signals to the first signals; and a drive comparator configured to eliminate false pulses due to high-frequency signals and noise superimposed on top of the differential sine wave signal by applying a unidirectional hysteresis for a negative edge, the drive comparator comprising:
  a first stage configured to generate a second signal that is an amplification of the differential sine wave signal,
  a gain stage configured to generate a third signal that is an amplification of the second signal from the first stage, a magnitude of the unidirectional hysteresis being controllable through the gain stage,
  an output stage configured to generate an output signal that is an amplification of the third signal from the gain stage, the output signal being a rail-to-rail square wave signal at an output of the drive comparator, and
  a programmable offset circuit configured to provide a programmable negative offset such that a non-inverting signal of the differential sine wave signal decreases further than the inverting signal of the differential sine wave signal for a falling edge of the output signal.

9. The system of claim 8, wherein the gyroscope comprises sense drive electrodes configured to generate the first signals.

10. The system of claim 8, further comprising:
  a phase-locked loop (PLL) circuit configured to receive the third signal and generate multiples of the output signal at its output; and
  a phase frequency extractor (PFE) circuit configured to receive an output signal from the PLL circuit and generate a rate demodulation phase signal and a quadrature demodulation phase signal.

11. The system of claim 8, wherein the first stage comprises:
  a first n-channel transistor having a gate terminal coupled to an inverting input of the differential sine wave signal, a drain terminal of the first n-channel transistor coupled to a first input of the gain stage;
  a second n-channel transistor having a gate terminal coupled to a non-inverting input of the differential sine wave signal, a drain terminal of the second n-channel transistor coupled to a second input of the gain stage; and
  a current source having a first terminal coupled to a shared node between source terminals of the first n-channel transistor and the second n-channel transistor, and a second terminal of the current source coupled to reference ground.

12. The system of claim 11, wherein the gain stage comprises:
  a plurality of n-channel transistors having source terminals coupled to reference ground;
  a plurality of p-channel transistors having source terminals coupled to a supply voltage; and
  a plurality of latches configured to increase a transconductance and operational speed of the circuit.

13. The system of claim 8, wherein the programmable offset circuit comprises:
  an n-channel transistor having a gate terminal coupled to an output of the circuit, a drain terminal of the n-channel transistor coupled to an input of the gain stage; and
  a current source having a first terminal coupled to a source terminal of the n-channel transistor, a second terminal of the current source coupled to reference ground.

14. The system of claim 8, wherein the gyroscope comprises sense drive electrodes configured to generate charge signals, and wherein the charge-to-voltage converter is coupled between the gyroscope and the drive comparator.

15. A system for demodulating rate and quadrature signals, the system comprising:
  a drive comparator configured to eliminate false pulses due to high-frequency signals and noise superimposed on top of the differential sine wave signal by applying a unidirectional hysteresis for a negative edge, comprising:
    a first stage configured to generate a first signal that is an amplification of a differential sine wave signal, the differential sine wave signal corresponding to an oscillation of a proof mass of a gyroscope;
    a gain stage configured to generate a second signal that is an amplification of the first signal from the first stage, a magnitude of the unidirectional hysteresis being controllable through the gain stage;
    an output stage configured to generate a third signal that is an amplification of the second signal from the gain stage, the third signal being a rail-to-rail square wave signal at an output of the drive comparator; and
    a programmable offset circuit configured to provide a programmable negative offset such that a non-inverting signal of the differential sine wave signal decreases further than the inverting signal of the differential sine wave signal for a falling edge of the third signal; and
  a phase-locked loop (PLL) circuit and a phase frequency extractor (PFE) circuit coupled to the drive comparator and configured to generate demodulation signals based on the third signal.

16. The system of claim 15, wherein the PLL circuit is configured to receive the third signal and generate multiples of the output signal at its output, and wherein the PFE circuit is coupled to the output of the PLL circuit and is configured to generate a rate demodulation phase signal and a quadrature demodulation phase signal.

17. The system of claim 15, wherein the first stage comprises:
  a first n-channel transistor having a gate terminal coupled to an inverting input of the differential sine wave signal, a drain terminal of the first n-channel transistor coupled to a first input of the gain stage;
  a second n-channel transistor having a gate terminal coupled to a non-inverting input of the differential sine wave signal, a drain terminal of the second n-channel transistor coupled to a second input of the gain stage; and
  a current source having a first terminal coupled to a shared node between source terminals of the first n-channel transistor and the second n-channel transistor, and a second terminal of the current source coupled to reference ground.

18. The system of claim 15, wherein the gain stage comprises:
  a plurality of n-channel transistors having source terminals coupled to reference ground;
  a plurality of p-channel transistors having source terminals coupled to a supply voltage; and
  a plurality of latches configured to increase a transconductance and operational speed of the circuit.

19. The system of claim 15, wherein the programmable offset circuit comprises:

an n-channel transistor having a gate terminal coupled to an output of the circuit, a drain terminal of the n-channel transistor coupled to an input of the gain stage; and a current source having a first terminal coupled to a source terminal of the n-channel transistor, a second terminal of the current source coupled to reference ground.

20. The system of claim 15, further comprising a phase-locked loop (PLL) circuit coupled between the drive comparator and the PFE circuit, the PLL circuit configured to receive the third signal and generate multiples at its output.

* * * * *